(12) United States Patent
Uhrich et al.

(10) Patent No.: US 10,648,414 B2
(45) Date of Patent: May 12, 2020

(54) METHOD AND SYSTEM FOR ENGINE CONTROL

(71) Applicant: Ford Global Technologies, LLC, Dearborn, MI (US)

(72) Inventors: Michael Uhrich, Wixom, MI (US); Imtiaz Ali, Lathrup Village, MI (US); Mario Anthony Santillo, Canton, MI (US); Joseph Thomas, Holt, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 15/986,158

(22) Filed: May 22, 2018

(65) Prior Publication Data

US 2019/0360413 A1 Nov. 28, 2019

(51) Int. Cl.
*F02D 41/12* (2006.01)
*F02D 41/00* (2006.01)
*F02D 41/38* (2006.01)

(52) U.S. Cl.
CPC ..... *F02D 41/0087* (2013.01); *F02D 41/0005* (2013.01); *F02D 41/38* (2013.01); *F02D 2041/0012* (2013.01); *F02D 2200/0616* (2013.01); *F02D 2200/08* (2013.01); *F02D 2200/501* (2013.01)

(58) Field of Classification Search
CPC .. F02D 41/123; F02D 41/126; F02D 41/0087; F02D 41/0005; F02D 41/38; F02D 2200/08; F02D 2200/501; F02D 2200/0616; F02D 2041/0012
See application file for complete search history.

(56) References Cited

U.S. PATENT DOCUMENTS

| | | | |
|---|---|---|---|
| 6,553,962 B1 * | 4/2003 | Russ | F02D 13/06 123/322 |
| 9,714,613 B2 * | 7/2017 | Holub | F02D 9/02 |
| 9,790,867 B2 * | 10/2017 | Carlson | F02D 17/02 |
| 2016/0069242 A1 * | 3/2016 | Miyamoto | F01N 11/00 60/277 |
| 2017/0342927 A1 * | 11/2017 | Miyamoto | F02D 41/123 |

* cited by examiner

*Primary Examiner* — Sizo B Vilakazi
(74) *Attorney, Agent, or Firm* — Geoffrey Brumbaugh; McCoy Russell LLP (57) ABSTRACT

Methods and systems are provided for improving fuel efficiency, monitor completion, and tailpipe emissions of a variable displacement engine. Fueling is initially disabled in cylinders selected to be deactivated while pumping air through the cylinders to an exhaust after-treatment catalyst and oxygen sensor. Once the sensor shows a lean response and catalyst monitoring is completed, cylinder valve operation is also disabled to reduce pumping losses and prevent further oxygen saturation of exhaust components.

20 Claims, 4 Drawing Sheets

METHOD AND SYSTEM FOR ENGINE CONTROL

FIELD

The present description relates generally to methods and systems for controlling a vehicle engine having variable displacement capabilities to provide additional fuel economy benefits.

BACKGROUND/SUMMARY

Some engines, known as variable displacement engines (VDE), may be configured to operate with a variable number of active and deactivated cylinders to increase fuel economy. Therein, a portion of the engine's cylinders may be disabled during selected conditions defined by parameters such as a speed/load window, as well as various other operating conditions including engine temperature. An engine control system may disable a selected group of cylinders, such as a bank of cylinders, through the control of a plurality of selectively deactivatable fuel injectors that affect cylinder fueling (also referred to as a deceleration fuel shut-off event, or DFSO), and/or through the control of the ignition system to selectively control (e.g., withhold) spark to deactivatable cylinders. In some examples, an engine controller may continuously rotate the identity of cylinders that receive air and fuel, and those that are skipped, as well as vary a number of cylinder events over which a specific deactivation pattern is applied. By skipping air and fuel delivery to selected cylinders, the active cylinders can be operated near their optimum efficiency, increasing the overall operating efficiency of the engine. By varying the identity and number of cylinders skipped, a large range of engine displacement options may be possible.

Still further improvements in fuel economy can be achieved by selectively deactivating a plurality of cylinder valve deactivators that affect the operation of the cylinder's intake and/or exhaust valves. One example of a deceleration cylinder cut-off operation (DCCO) is shown by Carlson et al. in U.S. Pat. No. 9,790,867. Therein, during conditions when engine torque is not required, each cylinder is deactivated in the working cycle following the DCCO entry decision by deactivating fuel and disabling air from being pumped through the cylinder valves.

However, the inventors herein have recognized potential issues with such systems. As one example, the DCCO operation may directly interfere with on-board diagnostic (OBD) routines that need to be completed to ensure emissions compliance. For example, exhaust catalysts and associated oxygen sensors may be diagnosed during a DFSO event by leveraging the air absent of fuel being pumped through the cylinders. Therein, a lean response to the DFSO is used to indicate that the catalyst and oxygen sensors are functioning as expected. Typically, OBD routines must be attempted a number of times, and completed another number of times, within a drive cycle for emissions to be considered compliant. Deactivating of cylinder valves results in no air being pumped through the cylinders to the exhaust system, making it difficult for the diagnostics to be performed.

In one example, the issues described above may be addressed by a method for operating an engine with selectively deactivatable cylinders, comprising: responsive to decreased torque demand, deactivating fuel to a cylinder, while maintaining valve operation; and further deactivating the valve operation of the cylinder responsive to completion of an exhaust catalyst and/or associated exhaust oxygen sensor diagnostic. In this way, the benefits of both a DFSO and a DCCO can be leveraged without compromising OBD completion and emissions compliance.

As one example, responsive to cylinder deactivation conditions being met, one or more engine cylinders may be selectively deactivated by disabling fuel (DFSO) and spark delivery while continuing to pump air through cylinder intake and exhaust valves. Once the DFSO is initiated, OBD routines may be conducted to diagnose one or more exhaust catalysts and exhaust oxygen sensors. For example, it may be determined if a lean response is observed at the exhaust catalysts and exhaust oxygen sensors. In some examples, prior to disabling, the cylinder fueling may be adjusted to enrich the downstream oxygen sensor and catalyst. Then after disabling the fueling, an engine controller may monitor the exhaust components for a rich-to-lean transition. Upon completion of the monitoring, such as upon confirming a lean response at a downstream HEGO sensor and exhaust catalyst, cylinder valves may be deactivated. In other words, the engine may be transitioned from the DFSO state to the DCCO state based on the exhaust response.

In this way, deactivation of cylinder fueling and cylinder valve operation can be better coordinated with the completion of OBD routines. The technical effect of diagnosing the performance of an exhaust catalyst and oxygen sensor after disabling cylinder fueling and before disabling cylinder valve operation is that the fuel economy benefits of both a DFSO operation and a DCCO operation can be achieved without compromising on emissions compliance. By delaying the DCCO operation until a rich-to-lean transition is observed at an exhaust oxygen sensor, catalyst and sensor monitoring may be attempted and completed during a drive cycle. Overall, engine fuel economy and exhaust emissions are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
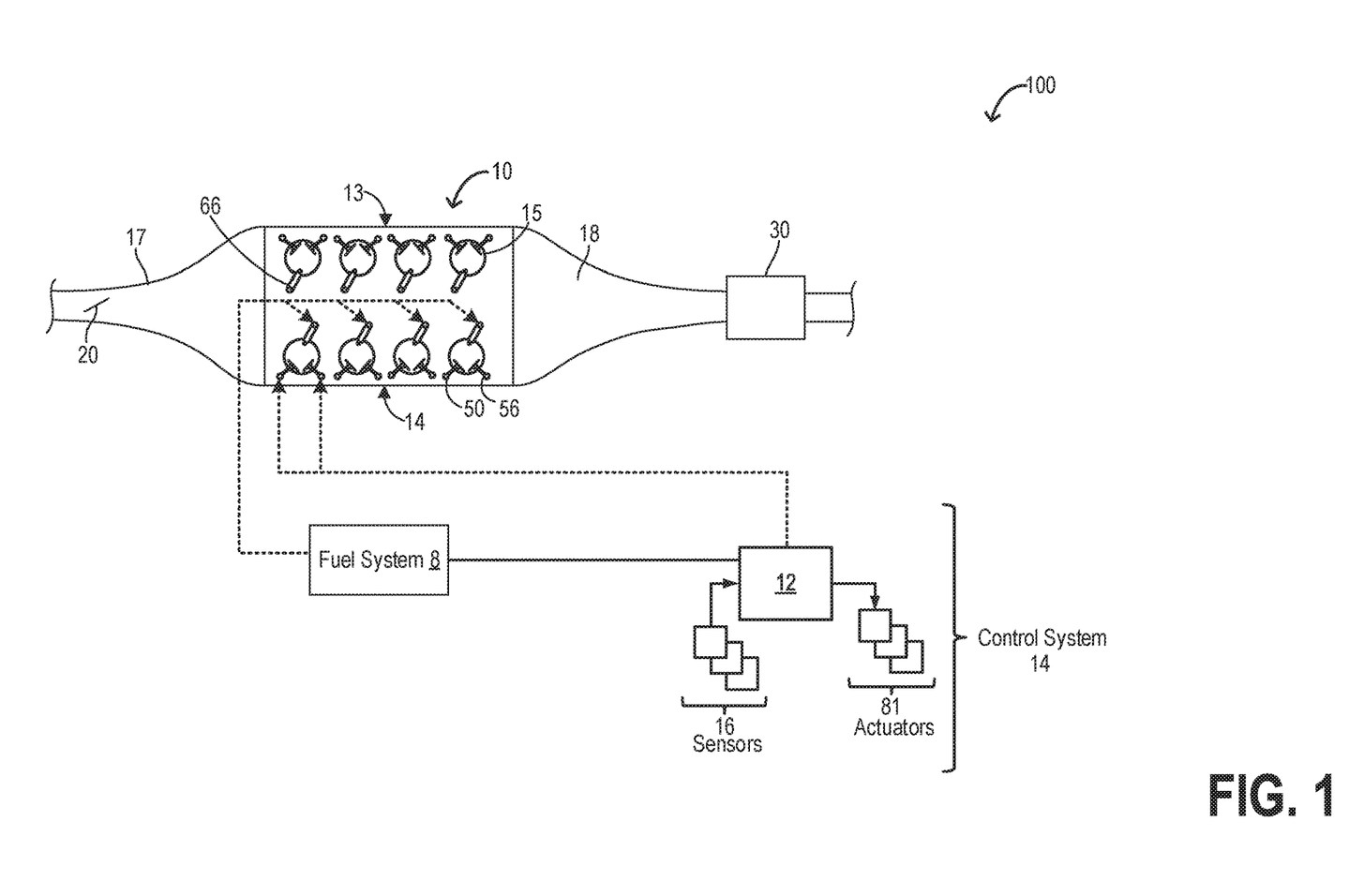
FIG. 1 shows a schematic depiction of an example engine system that is selectively deactivatable.
Figure 2:
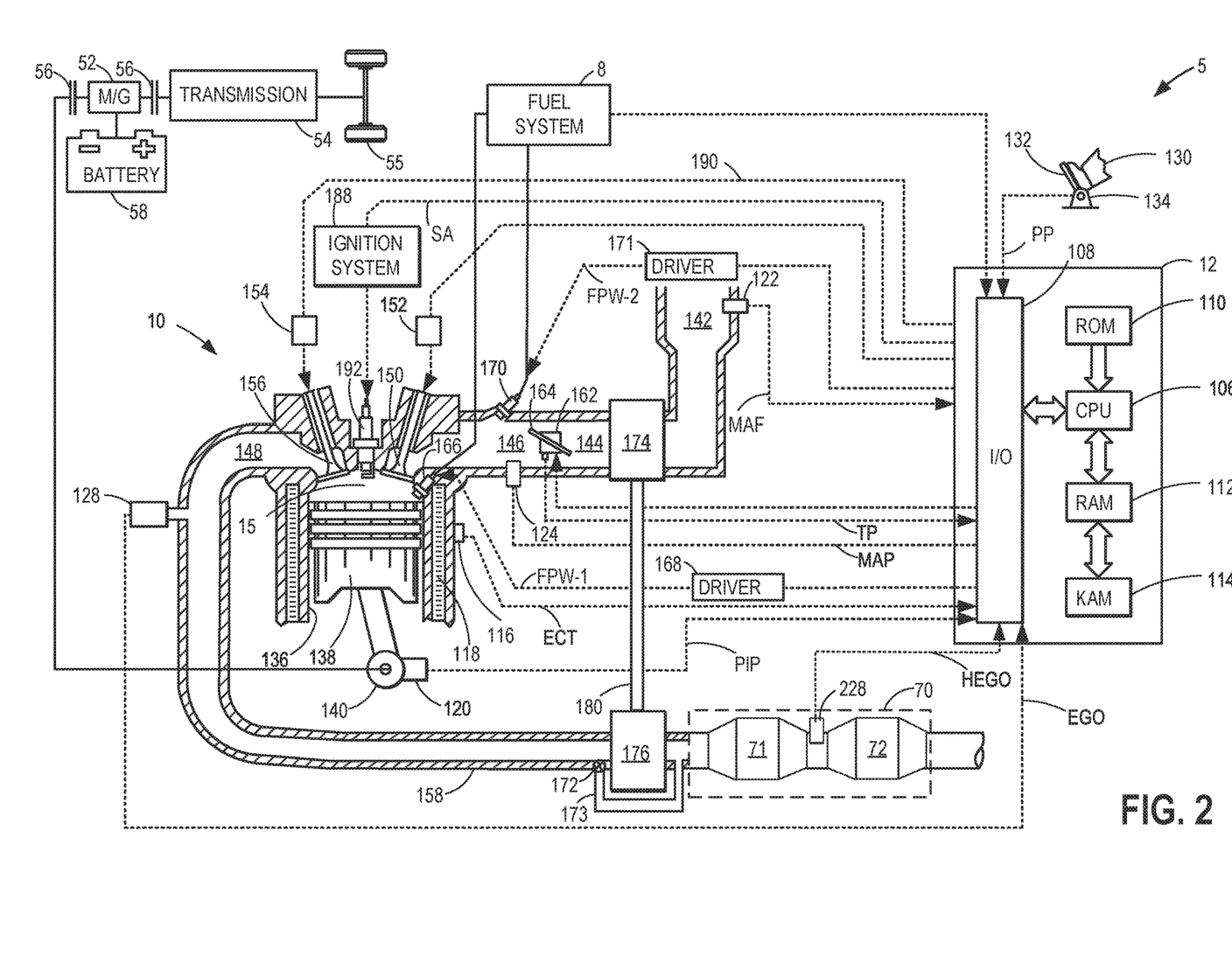
FIG. 2 shows a schematic diagram of a vehicle system with an emission control device that includes the engine system of FIG. 1.

The following description relates to systems and methods for improving emissions compliance in an engine configured with selectively deactivatable cylinders, such as the engine system of FIG. 1 coupled in the vehicle system of FIG. 2. An engine controller may be configured to perform a control routine, such as the example routine of FIG. 3, to disable cylinder fueling responsive to cylinder deactivation conditions being met while delaying cylinder valve deactivation until a lean response is observed at a downstream exhaust component. An example cylinder deactivation event is shown at FIG. 4. In this way, fuel economy and emissions compliance are both achieved.

Turning now to FIG. 1, an example engine system 100 is shown. Engine system 100 includes an engine 10 having a first cylinder bank 13 and a second cylinder bank 14. In the depicted example, engine 10 is a V-8 engine with two cylinder banks, each having four cylinders 15. However in alternate examples, the engine may have an alternate configuration, such as an alternate number of cylinders (e.g., V-4, V-6, etc.), or an in-line arrangement of cylinders (e.g., I-3, I-4, etc.). Engine 10 has an intake manifold 17, with intake throttle 20, and an exhaust manifold 18 coupled to an emission control system 30. Emission control system 30 includes one or more catalysts and air-fuel ratio sensors, such as described with regard to FIG. 2. Engine 10 may operate on a plurality of substances, which may be delivered via fuel system 8. As one non-limiting example, engine 10 can be included as part of a propulsion system for a passenger vehicle, such as the vehicle system of FIG. 2.

Engine 10 may be a variable displacement engine (VDE), having one or more cylinders 14 with selectively deactivatable (direct) fuel injectors 66. Therein, selected cylinders may be deactivated by shutting off the respective fuel injectors and disabling spark delivery. Fueling may be deactivated while maintaining operation of cylinder intake and exhaust valves such that air may continue to be pumped through the cylinders. This process may be referred to herein as a deceleration fuel shut-off (or cut-off) event, or simply DFSO.

In some examples, one or more of the cylinders 15 may also be configured with selectively deactivatable intake valves 50 and selectively deactivatable exhaust valves 56. Therein, selected cylinders may be deactivated by shutting off the respective cylinder valves, by a process referred to herein as a deceleration cylinder cut-off event, or simply DCCO. In one example, intake valves 50 and exhaust valves 56 are configured for electric valve actuation (EVA) via electric individual cylinder valve actuators. In other examples, the intake and exhaust valves may be cam-actuated. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on the first cylinder bank 13, and/or selectively deactivating one or more cylinders on the second cylinder bank 14. The number and identity of cylinders deactivated on the cylinder bank may be symmetrical or asymmetrical. An engine controller 12 may continually analyze individual cylinders, determining whether to activate or deactivate each cylinder based on a driver's pedal position input and torque demands, providing what is known as a skip-fire or rolling VDE (rVDE) mode of operation. In still other examples, entire banks or subsets of cylinders may be deactivated.

During the deactivation, selected cylinders may be deactivated by first disabling cylinder fueling (that is, DFSO) while allowing air to continue to be pumped through the deactivated cylinders. In addition to stopping fuel flow to the deactivated cylinders, spark to the deactivated cylinders may also be stopped, such as by selectively controlling the vehicle ignition system to only deliver spark to active cylinders. While the selected cylinders are disabled, the remaining enabled or active cylinders continue to carry out combustion with fuel injectors 66 and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Oxygen in the air pumped through the deactivated cylinders, however, can cause oxygen saturation and consequent deactivation of an after-treatment exhaust catalyst of emission control device 30 due to prolonged exposure to a leaner than stoichiometric air-fuel ratio. Following the deactivation, the regeneration of the exhaust catalyst requires the air-fuel ratio to run richer than stoichiometry for a duration. This can reduce the fuel economy impact of the VDE operation. However, the change in air-fuel ratio (specifically, the transition to a leaner air-fuel ratio upon disabling cylinder fueling) can be advantageously leveraged to diagnose the after-treatment catalyst, and any associated oxygen sensors, particularly when conducting an on-board diagnostic routine.

Further improvements in fuel economy are achieved by also deactivating individual cylinder valve mechanisms. Therein, cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder.

Closing individual cylinder valve mechanisms (e.g., VDE mechanisms), such as intake valve mechanisms, exhaust valve mechanisms, or a combination of both, reduces the oxygen saturation of the after-treatment catalyst in addition to reducing cylinder pumping losses. However, the DCCO renders an engine controller unable to schedule an on-board routine for diagnosing the after-treatment catalyst. As elaborated herein with reference to FIG. 3, responsive to cylinder deactivation conditions, an engine controller may initiate a DFSO operation. Then, the controller may diagnose an exhaust catalyst and any associated after-treatment exhaust gas oxygen sensors, such as based on the observation of a rich-to-lean transition. Then, based on the oxygen sensor response, a DCCO event may be initiated. This enables the fuel economy benefit of both the DFSO and the DCCO to be provided while also enabling the OBD tests to be completed.

Cylinders 15 may be deactivated to provide a specific firing (e.g., skip-firing or rolling VDE) pattern based on a designated control algorithm. More specifically, selected "skipped" cylinders are not fired while other "active" cylinders are fired. Optionally, a spark timing associated with a selected firing of a selected working chamber may also be adjusted based on a firing order or firing history of the selected working chamber. As used herein, the firing pattern or deactivation pattern may include a total number of deactivated cylinders relative to remaining active cylinders, as well as an identity of the deactivated and active cylinders. The firing pattern may further specify a total number of combustion events for which each deactivated cylinder is held deactivated, and/or a number of engine cycles over which the pattern is operated. The engine controller 12 may be configured with suitable logic, as described below, for determining a cylinder deactivation (or skip-firing) pattern based on engine operating conditions. For example, the controller may select a desired induction ratio to apply based on engine operating parameters, including operator torque demand, and then select a cylinder deactivation pattern that enables the desired induction ratio to be provided. As used herein, the induction ratio is defined as the number of actual cylinder induction events (e.g., cylinders firing) that occur divided by the number of cylinder induction event opportunities (e.g., total engine cylinders).

Engine controller 12 may include a drive pulse generator and a sequencer for determining a cylinder pattern that provides the desired induction ratio based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped, thereby enabling the desired induction ratio to be provided.

Since optimal efficiency for a given cylinder is near full output, a lower frequency of firing events may be chosen to reduce output. For example, skipping every other cylinder would produce half of the power, on average. In addition, a spacing between the firing events may be adjusted to minimize NVH. Whether all of the cylinders are included in the skip-firing pattern may depend on the fraction of the full engine output desired, the full engine torque output itself depending upon various conditions, such as cam timing, cylinder temperature, etc.

In this way, by adjusting the cylinder pattern of individual cylinder valve mechanisms and individual cylinder fuel injectors, a desired engine output can be provided by operating fewer cylinders more efficiently, thereby improving fuel economy.

Engine 10 may be controlled at least partially by a control system 14 including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of throttle position from a throttle position sensor.

Turning now to FIG. 2, it schematically illustrates one cylinder of a multi-cylinder engine 10, which may be included in a propulsion system of a vehicle system 5. In one example, engine 10 is the variable displacement engine 10 of FIG. 1. Components previously introduced may be similarly numbered.

In some examples, vehicle system 5 may be a hybrid vehicle with multiple sources of torque available to one or more vehicle wheels 55. In other examples, vehicle system 5 is a conventional vehicle with only an engine, or an electric vehicle with only electric machine(s). In the example shown, vehicle system 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (e.g., cylinder) 15 of engine 10 may include combustion chamber walls 136 with piston 138 positioned therein. In some embodiments, the face of piston 138 inside cylinder 15 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor (not shown) may be coupled to crankshaft 140 via a flywheel to enable a starting operation of engine 10.

Combustion chamber 15 may receive intake air from intake manifold 146 via intake passages 142 and 144, and may exhaust combustion gases via exhaust manifold 148. In this way, intake passages 142 and 144 are fluidically coupled to intake manifold 146. Intake manifold 146 and exhaust manifold 148 can selectively communicate with combustion chamber 14 via a respective intake valve 150 and exhaust valve 156. In some embodiments, combustion chamber 15 may include two or more intake valves and/or two or more exhaust valves.

Intake valve 150 and exhaust valve 156 may be controlled by controller 12 via respective electric variable valve actuators 152 and 154. Alternatively, the variable valve actuators 152 and 154 may be electro-hydraulic, cam actuated, or any other conceivable mechanism to enable valve actuation. During some conditions, controller 12 may vary the signals provided to the variable valve actuators to control the opening and closing of the respective intake and exhaust valves. The position of intake valve 150 and exhaust valve 156 may be determined by respective valve position sensors (not shown). In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 15 may alternatively include an intake valve controlled via electric valve actuation and an exhaust valve controlled via cam actuation including CPS and/or VCT.

Fuel injector 166 is shown coupled directly to combustion chamber 14 for injecting fuel directly therein in proportion to the pulse width of signal FPW-1 received from controller 12 via electronic driver 168. In this manner, fuel injector 166 provides what is known as direct injection of fuel into combustion chamber 14. It will be appreciated that the fuel injector may be mounted in the side of the combustion chamber or in the top of the combustion chamber, for example.

Fuel injector 170 is shown coupled directly to intake manifold 146 for injecting fuel directly therein in proportion to the pulse width of signal FPW-2 received from controller 12 via electronic driver 171. In this manner, fuel injector 170 provides what is known as port injection of fuel into intake manifold 146. Fuel may be delivered to fuel injector 166 and 170 by a fuel system 8 that may include a fuel tank, a fuel pump, and a fuel rail. It will be appreciated that engine 10 may include one or more of port fuel injection and direct injection.

As previously mentioned, some engine embodiments may include operating one or more cylinders of the engine in a deceleration fuel shut-off (DFSO) mode to increase fuel economy. When the engine is operated in DFSO mode, the engine is operated without fuel injection while the engine continues to rotate and pump air through the cylinders. Specifically, fuel injection via fuel injector 166 and/or fuel injector 170 to one or more cylinders 15 is disabled while intake air may continue to be pumped through the cylinders from the intake manifold to the exhaust manifold through the cylinders, via the operating intake and exhaust valves. DFSO entry conditions may be based on a plurality of vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, DFSO entry conditions may be met when engine cylinders can be deactivated, such as when the vehicle is decelerating (e.g., vehicle speed is decreasing). In another example, the DFSO entry conditions (and cylinder deactivation conditions) may be based on an engine speed below a threshold. In yet another example, the DFSO entry conditions may be based on an engine load below a threshold and/or decreasing engine load. In still another example, the DFSO condition may be based on an accelerator pedal position that indicates no torque is being requested. For example, during a tip-out where an operator releases the accelerator pedal (e.g., input device 132), cylinder deactivation and DFSO entry conditions may be met.

One or more cylinders of the engine may additionally be operated in a deceleration cylinder cut-off (DCCO) mode to further increase fuel economy over and above the fuel economy achieved in the DFSO mode. When the engine is operated in DCCO mode, the engine is operated without fuel injection and additionally the cylinder valves are deactivated to prevent air from being pumped through the cylinders. Closing of the valves disables flow of air to the exhaust components, and does not allow any oxygen from the air to saturate the after-treatment catalyst. Instead, the cylinders act as an air spring where most of the energy put into the compression stroke is returned in the following blowdown stroke. In the DCCO mode, fuel injection via fuel injector 166 and/or fuel injector 170 to one or more cylinders 15 is disabled and intake air may not be allowed to be pumped through the cylinders from the intake manifold to the exhaust manifold through the cylinders, via the operating intake and exhaust valves. DCCO entry conditions may be the same as those discussed earlier with reference to DFSO entry conditions. In addition, as elaborated at FIG. 3, a transition from the DFSO mode to the DCCO mode may be enabled after cylinder deactivation conditions are met responsive to the diagnostic for a downstream exhaust oxygen sensor and exhaust catalyst being completed. This allows there to be sufficient air flow after fuel is disabled for OBD routines to be completed, and thereafter air flow can also be disabled through the deactivated cylinders.

Ignition system 188 can provide an ignition spark to combustion chamber 15 via spark plug 192 in response to spark advance signal SA from controller 12, under select operating modes. Though spark ignition components are shown, in some embodiments, combustion chamber 15 or one or more other combustion chambers of engine 10 may be operated in a compression ignition mode, with or without an ignition spark.

Intake passage 144 or intake manifold 146 may include a throttle 162 (which may be throttle 20 of FIG. 1, in one example) having a throttle plate 164. In this particular example, the position of throttle plate 164, or a throttle opening, may be varied by controller 12 via a signal provided to an electric motor or actuator included with throttle 162, a configuration that is commonly referred to as electronic throttle control (ETC). In this manner, throttle 162 may be operated to vary the intake air provided to combustion chamber 15 among other engine cylinders. The position of throttle plate 164 may be provided to controller 12 by throttle position signal TP. Intake passage 142 may include a mass airflow sensor 122 for providing a MAF signal to controller 12, and intake manifold 146 may include a manifold absolute pressure sensor 124 for providing a MAP signal to controller 12.

Engine 10 may further include a compression device such as a turbocharger or supercharger including at least a compressor 174 arranged along intake passage 144. For a turbocharger, compressor 174 may be at least partially driven by a turbine 176 (e.g., via a shaft 180) arranged along an exhaust passage 158. If the engine includes a supercharger, compressor 174 may be at least partially driven by the engine 10 and/or an electric machine, and may not include a turbine. The compression device (e.g., turbocharger or supercharger) allows the amount of compression provided to one or more cylinders of the engine to be varied by controller 12.

In some embodiments, engine 10 may include an exhaust gas recirculation (EGR) system that includes a low pressure (LP) EGR and/or high pressure (HP) EGR passage for recirculating exhaust gas (not shown). One example of an EGR system includes a low pressure (LP) EGR system, where EGR may be routed from downstream of turbine 176 of a turbocharger to upstream of a compressor 174 of the turbocharger. In a high pressure (HP) EGR system, EGR may be routed from upstream of the turbine 176 of the turbocharger to downstream of the compressor 174 passage of the turbocharger. In both the LP and HP EGR systems, the amount of EGR provided to intake manifold 146 may be varied by controller 12 via a respective LP EGR valve and HP EGR valve (not shown). Further, an EGR sensor (not shown) may be arranged within the respective LP EGR passage and/or HP EGR passage, and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust oxygen sensor 128 and/or an intake oxygen sensor (not shown). Under some conditions, the EGR system may be used to regulate the temperature of the air and fuel mixture within the combustion chamber and/or the temperature proximate to a particulate filter 72.

It will be appreciated that in several embodiments, exhaust passage 158 may include a bypass passage 173 with an inlet positioned upstream of the turbine 176. A flow control valve, known as a wastegate valve 172, may be disposed in the bypass passage. By adjustment of the position (e.g., degree of opening) of the wastegate valve 172, the amount of exhaust gas bypassing turbine 176 may be controlled. Position of the wastegate valve may be controlled via a wastegate actuator (not shown, and which may be hydraulic, pneumatic, electric, or mechanical in nature) responding to a signal from controller 12. For example, the controller 12 may receive an operator request to increase engine torque, and may increase boost pressure in order to meet the torque request.

Similarly, it will be appreciated that compressor 174 may include a recirculation passage (not shown) across the compressor. The recirculation passage may be used for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of a charge air cooler (not shown) to the compressor inlet or compressor bypass for dissipating compressed air to atmosphere. A flow control valve, known as a compression recirculation valve (not shown), may be included between the intake passage 142 and the recirculation passage. Depending on position of the wastegate valve, the amount of recirculating intake air may be controlled.

Emission control device (ECD) 70 is shown arranged along exhaust passage 158 downstream of exhaust manifold 148 and downstream of exhaust gas sensor 128. Exhaust gas sensor 128 is shown coupled to exhaust passage 158 upstream of emission control device (ECD) 70. Exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In the depicted example, exhaust gas sensor 128 is configured as a UEGO.

In this example, ECD 70 (herein also referred to as the exhaust after-treatment system) includes a first upstream catalyst 71 and a second downstream catalyst 72. In one example, the first, upstream catalyst is a three way catalytic converter (TWC), but it will be appreciated that any type of catalyst or catalytic converter may be used without departing from the scope of this disclosure, such as a diesel oxidation catalyst (DOC), a selective catalytic reduction catalyst (SCR), lean NOx trap (LNT), etc. The second downstream catalyst 72 may be a particulate filter (PF), but it will be appreciated that the filter may be any type of particulate filter, including but not limited to a diesel particulate filter (DPF) or a gasoline particulate filter (GPF). In alternate examples, the second catalyst may be a secondary TWC, or a coated PF (such as a combination of PF and TWC). Further still, in some examples, the first catalyst may be a full-volume system occupying all the volume of the ECD, in which case there may be no separate second catalyst.

ECD 70 further includes a downstream exhaust gas oxygen sensor, also referred to herein as a catalyst monitor sensor (CMS) 228, which may be any type of exhaust gas sensor, including an oxygen sensor or HEGO sensor. In the depicted example, CMS 228 is configured as a HEGO sensor. CMS 228 is coupled downstream of upstream catalyst 71 and may be used to assess the state of the catalyst during the execution of a catalyst monitor, which may be included as one of the on-board diagnostic routines executed by controller 12 when selected conditions are met. In particular, responsive to deceleration fuel shut-off conditions being met, CMS 228, operating as a HEGO (heated exhaust gas oxygen) sensor, may monitor an air-fuel ratio of the exhaust gas exiting upstream catalyst 71. Therein, responsive to the disabling of fuel but not air during a DFSO, a transition to a leaner than stoichiometric air-fuel ratio is reflective of the upstream catalyst being functional. The lean response at the HEGO during the DFSO may also be used to diagnose the HEGO sensor. In still further examples, the upstream catalyst 71 may be diagnosed based on the output of the upstream sensor (EGO 128) relative to the downstream sensor HEGO 228). Likewise, HEGO sensor 228 may be diagnosed by comparing the output of the downstream HEGO sensor to the upstream EGO sensor. As discussed above, after disabling cylinder fueling and upon confirming that the CMS and the TWC have been diagnosed, the engine controller may proceed to disable cylinder valves to improve fuel economy during low load conditions.

Controller 12 (which may include controller 12 of FIG. 1) is shown in FIG. 2 as a microcomputer, including microprocessor 106, input/output ports 108, an electronic storage medium (e.g., computer-readable) for executable programs and calibration values shown as read-only memory 110 in this particular example, random access memory 112, keep alive memory 114, and a data bus. Storage medium read-only memory 110 can be programmed with computer readable data representing instructions executable by microprocessor unit 106 for performing the methods described herein, as well as other variants that are anticipated but not specifically listed. As described above, FIG. 2 shows one cylinder of a multi-cylinder engine, and it will be appreciated that each cylinder may similarly include its own set of intake/exhaust valves, fuel injector, spark plug, etc.

Controller 12 may receive various signals from sensors coupled to engine 10, in addition to those signals previously discussed, including a degree of operator-demanded torque from pedal position sensor 134, and an air-fuel ratio of exhaust gas downstream of the TWC 71 from catalyst monitor sensor (CMS or HEGO) 228. Controller 12 may also receive signals including measurement of inducted mass airflow (MAF) from mass airflow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP), or throttle opening, from a throttle position sensor; and manifold absolute pressure signal, MAP, from pressure sensor 124, which may be used to provide an indication of vacuum, or pressure, in the intake manifold. Engine speed signal, RPM, may be generated by controller 12 from signal PIP. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall Effect sensor 120, which is also used as an engine speed sensor, may produce a predetermined number of equally spaced pulses each and every revolution of the crankshaft. The controller 12 receives signals from the various sensors of FIGS. 1-2 (e.g., HEGO sensor 228, EGO sensor 128, pedal position sensor 134, etc.) and employs the various actuators (e.g., throttle plate 164, spark plug 192, fuel injectors 166, 170, valve actuators 152, 154, etc.) of FIGS. 1-2 to adjust engine operation based on the received signals and instructions stored on a memory of the controller.

For example, responsive to a drop in engine torque demand, based on the output of the pedal position sensor, the controller may send a command signal to at least fuel injector 166 to disable delivery of fuel to cylinder 15. At the same time, the controller may continue to actuate valves 150, 156 via actuators 152, 154. Then, while pumping air, without fuel, through the deactivated cylinder to the exhaust catalyst, the controller may diagnose upstream catalyst 71 based on a response output by CMS/HEGO sensor 228. Upon completion of the diagnostic, controller 12 may send a command signal to valve actuators 152, 154 to hold valves 150, 156 closed for a remaining duration of cylinder deactivation.

In this way, the components of FIGS. 1-2 enable an engine system comprising: a cylinder of an engine; a selectively deactivatable fuel injector coupled to the cylinder; a selectively deactivatable valve mechanism coupled to an intake valve and an exhaust valve of the cylinder; another cylinder of the engine; an exhaust after-treatment device coupled downstream of the cylinder and the another cylinder, the after-treatment device including a first, upstream catalyst and a second, downstream catalyst; a UEGO sensor coupled upstream of the first catalyst; a HEGO sensor coupled in between the first catalyst and the second catalyst; and a controller with computer readable instructions stored on non-transitory memory that when executed cause the controller to: responsive to decreased operator torque demand, operate the cylinder in a deceleration fuel shut-off mode with fuel disabled and valve operation enabled while maintaining the another cylinder active; monitor a change in air-fuel ratio at the first catalyst via an output of the HEGO sensor while flowing air, without fuel, through the cylinder to the exhaust after-treatment device; and responsive to the monitored change being indicative of oxygen saturation of the first catalyst, transition the cylinder to a deceleration cylinder cut-off mode with fuel and valve operation disabled. Additionally or optionally, the monitored change includes a transition from stoichiometric air-fuel ratio to leaner than stoichiometric air-fuel ratio. Further, the monitored change may be indicative of no oxygen saturation of the second catalyst. In some examples, additionally or optionally, the monitored change is further indicative of completion of a catalyst monitor. In any or all of the preceding examples, additionally or optionally, the controller includes further instructions that cause the controller to delay the transition from the deceleration fuel shut-off mode to the deceleration cylinder cut-off mode until the monitored change is indicative of oxygen saturation of the first catalyst.

Figure 3:
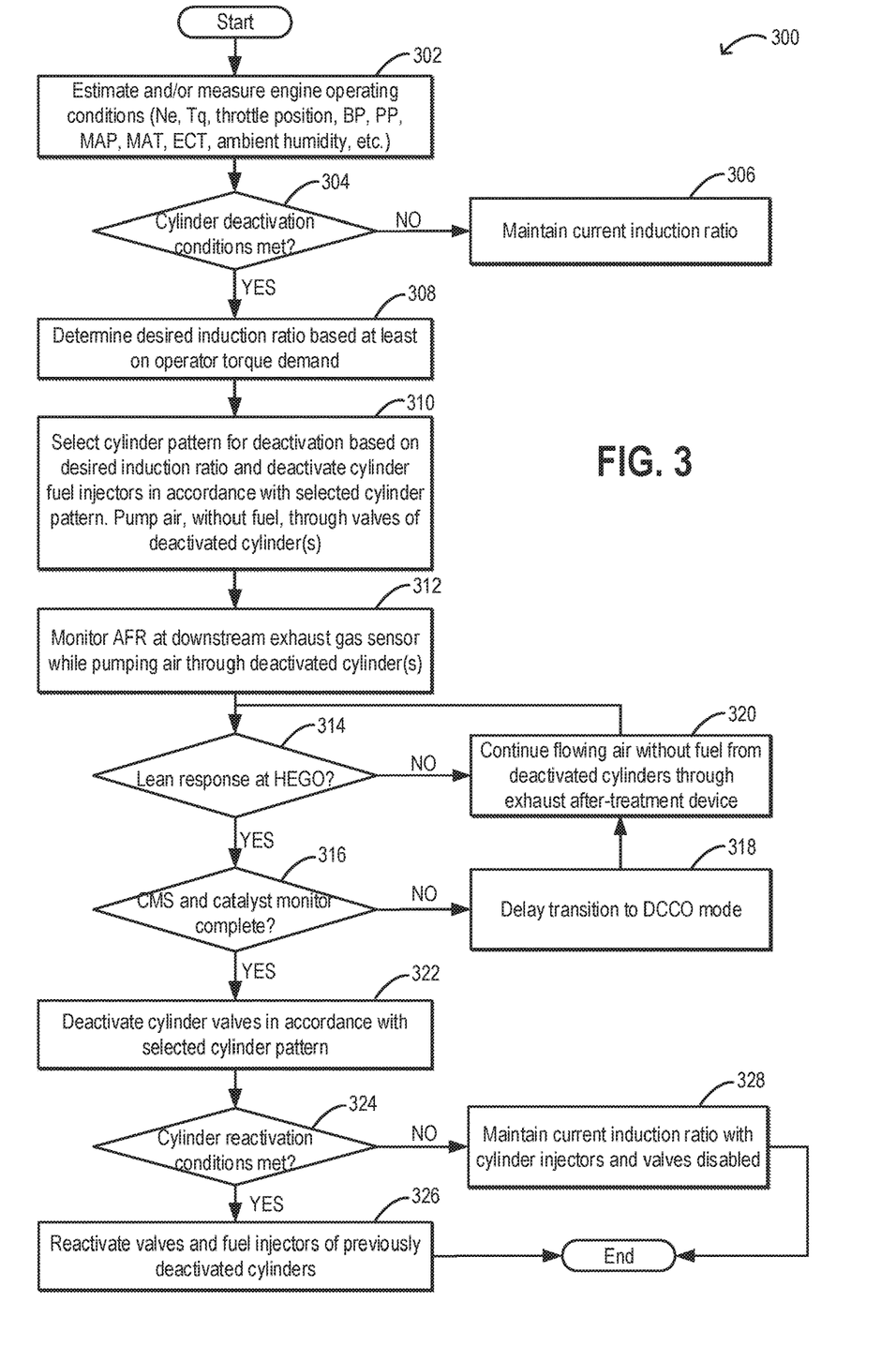
FIG. 3 shows a high level flow chart illustrating an example method for coordinating disabling of cylinder fueling and valve operation with exhaust component diagnostic routines.
Figure 4:
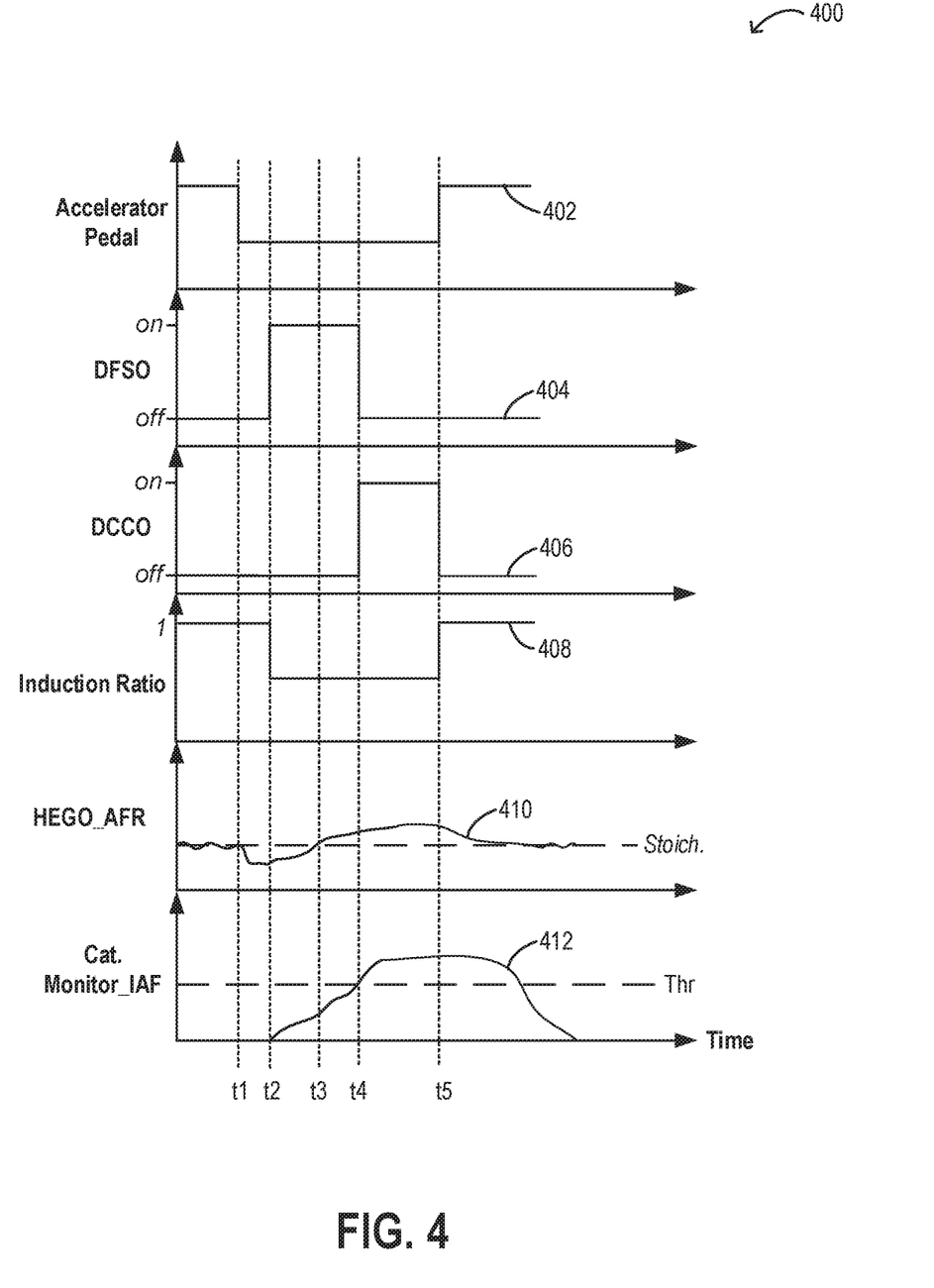
FIG. 4 shows a prophetic example of a cylinder deactivation event.

Turning now to FIG. 3, an example method 300 is shown for deactivating cylinders of a variable displacement engine. The method adjusts a timing of deactivating cylinder fueling relative to deactivating cylinder valve operation based on the observed response of a catalyst monitoring sensor. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions including, for example, engine speed, vehicle speed, operator torque demand, throttle position, barometric pressure (BP), boost pressure, accelerator pedal position (PP), manifold absolute pressure (MAP), mass air flow (MAF), engine dilution (e.g., EGR level), manifold air temp (MAT), engine coolant temperature (ECT) and ambient humidity.

At 304, the routine includes determining if cylinder deactivation conditions are met. In one example, cylinder deactivation conditions are considered met if engine torque demand is less than a threshold, such as may occur when an operator releases their foot from an accelerator pedal and allows the vehicle to coast. If cylinder deactivation conditions are not met, then at 306 the method includes maintaining a current induction ratio. The current induction ratio may include all engine cylinders being active and firing. The engine cylinder induction ratio is an actual total number of cylinder firing events over an actual total number of cylinder compression strokes. In one example, the actual total number of cylinder compression strokes is a predetermined number.

If cylinder deactivation conditions are met, then at 308, the method includes determining a desired induction ratio based the current operating conditions including at least the operator torque demand. As one example, a target induction ratio of 1/2 (or 0.5) implies that for every 2 cylinder events, one cylinder is fired and one is skipped. As another example, a target induction ratio of 1/3 (or 0.33) implies that for every 3 cylinder events, one cylinder is fired and the remaining two are skipped.

At 310, the routine includes selecting a cylinder pattern for deactivation that provides the desired induction ratio. As an example, an induction pattern for an induction ratio of 1/2 may include every other cylinder being selectively not fueled to produce half of the power, on average. Further, the same pattern may be applied for each consecutive engine cycle such that the same cylinders are skipped on consecutive engine cycles while the remaining cylinders are fired on each of the engine cycles, giving rise to a stationary pattern. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/2 may be provided by firing according to the induction pattern S-5-S-2-S-3-S-8 wherein S represents a skipped cylinder event.

As another example, an induction pattern for an induction ratio of 1/3 may include two out of every three cylinders being selectively not fueled to produce a third of the power, on average. Further, the induction ratio may be provided by different cylinders being skipped on each engine cycle, giving rise to a non-stationary pattern. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/3 may be provided by firing according to the pattern 1-S-S-2-S-S-7-S-S-5-S-S-6-S-S-8-S-S-4-S-S-3-S-S, wherein S represents a skipped cylinder event.

The target or desired induction ratio may be determined from the operator requested engine torque. In particular, allowable engine cylinder firing fraction values may be stored in a table or function that may be indexed by desired engine torque and engine speed. Engine cylinder firing fraction values that may provide the requested engine torque may be part of a group of available engine cylinder firing fraction values. Then, based on other vehicle operating conditions, some engine cylinder firing fractions may be eliminated from the group of available engine cylinder firing fraction values. For example, some engine cylinder firing fractions may be removed from the group if the cylinder firing fractions provide higher levels of engine vibration. Then, the engine cylinder firing fraction that provides the fewest number of active engine cylinders during a cycle may be selected from the group of available engine cylinder firing fraction values to provide the desired engine cylinder firing fraction. In this way, a single desired engine cylinder firing fraction may be selected from a group of a large number of engine cylinder firing fractions. It will be appreciated that the selected engine cylinder firing fraction may then be provided via one of a plurality of possible cylinder deactivation patterns, as elaborated below.

As used herein, an engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three. A cycle number refers to an engine cycle which includes one event (activation or deactivation) in each cylinder. For example, a first cycle is completed when each cylinder of an engine has completed all 4 stroke events (intake, exhaust, compression, and expansion events), in the firing order. The second cycle starts when each cylinder of the engine starts another iteration of all 4 stroke events.

Once the cylinder pattern corresponding to the desired induction ratio is selected, the controller may deactivate cylinders in accordance with the selected cylinder pattern to provide the target induction ratio. The selective cylinder deactivation includes, also at 310, for the selected cylinders to be deactivated, initially only deactivating the cylinder fuel injectors while continuing to operate the intake and exhaust valves so that air continues to be pumped through the cylinders. Cylinder fuel injectors may be deactivated, with no fuel injected into the cylinders, for an entire engine cycle of 720 crank angle degrees (that is, for all 4 strokes of a cylinder). As a result of disabling cylinder fueling, a deceleration fuel shut-off (DFSO) mode is entered.

As used herein, cylinder activation event refers to a cylinder firing (that is, fuel and spark enabled) with intake and exhaust valves opening and closing during a cycle of the cylinder. In comparison, a cylinder deactivation event may include one or more of a deceleration fuel shut-off (DFSO) event (or mode) and a deceleration cylinder cut-off (DCCO) event. The DFSO event includes a cylinder not firing (that is, fuel and spark disabled), with intake and exhaust valves continuing to pump air through the cylinder. In comparison, the DCCO event includes, in addition to fuel and spark being disabled, the intake and exhaust valves being held closed during a cycle of the cylinder.

It will be appreciated that the decision to activate or deactivate a cylinder may be made a predetermined number of cylinder events (e.g., one cylinder event, or alternatively, one cylinder cycle or eight cylinder events) before the cylinder is to be activated or deactivated to allow time to begin the process. For example, for an eight cylinder engine with a firing order of 1-3-7-2-6-5-4-8, the decision to activate or deactivate cylinder number seven may be made during an intake or compression stroke of cylinder number seven one engine cycle before cylinder number seven is activated or deactivated. Alternatively, the decision to activate or not activate a cylinder may be made a predetermined number of engine events or cylinder events before the selected cylinder is activated or deactivated. In still further examples, the number of cylinder events may be adjusted based on hardware capabilities and current engine operating conditions.

The air, without added fuel, that is pumped through the deactivated cylinders during the DFSO mode flows on through the exhaust system. This can result in oxygen saturation of the exhaust catalyst and an enleaning of the exhaust oxygen sensors. This transition can be advantageously leveraged for diagnosing the exhaust components. In particular, the oxygen flow to the after-treatment system during the DFSO event gives a large signal-to-noise benefit. When the oxygen floods the Heated Exhaust Gas Oxygen (HEGO) sensor (that is, the oxygen sensor coupled between the upstream catalyst and downstream catalyst of the after-treatment system, such as HEGO sensor 228 of FIG. 2, herein also referred to as the catalyst monitoring sensor or CMS), the response is measured and used as a diagnostic. Once the catalyst is saturated with oxygen, it needs "re-centering" to allow maximum efficiency. "Re-centering" is accomplished by operating the engine, upon reactivation, with an air/fuel ratio rich of stoichiometry. The amount of fuel for this event is in-turn used as a catalyst diagnostic. However, the added fuel requirement can reduce the fuel economy impact of the selective cylinder deactivation operation.

If the cylinder deactivation also includes deactivation of the valves, so that no air is pumped through the deactivated cylinders, a process herein also referred to as the DCCO mode, fuel efficiency is maximized. In particular, DCCO avoids saturating the catalyst with oxygen, thereby reducing the post-event refueling penalties. In addition, DCCO reduces pumping losses, allowing for longer deceleration events. During these deceleration events, DCCO also allows for more regenerative braking in vehicle equipped with regenerative braking capabilities. However, HEGO and catalyst monitor completions are negatively impacted. As elaborated below, the current method establishes a solution where fuel efficiency, monitor completion, and tailpipe emissions are satisfied by controlling the DCCO event using the downstream HEGO as a control mechanism to allow gas exchange in and out of each cylinder.

Specifically, when the HEGO sensor responds to the DFSO event, it is an indication that the monitored catalyst volume (which includes the volume of the after-treatment device from the UEGO sensor positioned upstream of the first, upstream catalyst to the HEGO sensor positioned upstream of the second, downstream catalyst) is saturated and therefore the DCCO can commence and not allow any further oxygen to saturate the unmonitored volume of catalyst (which includes the volume of the after-treatment device downstream of the HEGO sensor, including the second downstream catalyst). Once the HEGO and Catalyst monitors have completed for a given drive cycle, DFSO can initiate immediately into a DCCO event.

Thus at 314, while operating in the DFSO mode, it may be determined if a lean response has been observed at the HEGO sensor (or CMS). This includes confirming that the output of the HEGO sensor coupled in between the upstream and downstream catalyst of the after-treatment device (such as HEGO sensor 228 coupled between upstream catalyst 71 and downstream catalyst 72 of ECD 70 of FIG. 2) has an output corresponding to a leaner than stoichiometric air-fuel ratio. The output of the sensor may have corresponded to a stoichiometric air-fuel ratio before the cylinder fuel injectors were deactivated. Alternatively, it may be confirmed that the output of the HEGO sensor is leaner than the output prior to cylinder fuel deactivation by more than a threshold amount. In still other examples, such as where a rich air-fuel ratio was used in cylinders prior to the DFSO, it may be determined if a rich to lean transition is observed at the HEGO. If a sufficiently lean response is not confirmed, then at 320, the method includes continuing to flow air without fuel from deactivated cylinders through the cylinder valves to the exhaust after-treatment device. In other words, the DFSO mode is continued and the DCCO mode is delayed. The method then returns to 314 to continue monitoring the HEGO sensor output.

Once a sufficiently lean response is confirmed, at 316, it may be confirmed if CMS and catalyst monitoring has been completed. For example, catalyst monitoring may include the controller estimating an amount of fuel needed to drive the monitored catalyst volume to breakthrough rich from a starting point that is oxygen saturated. This corresponds to the amount of fuel that would need to be added during a subsequent cylinder reactivation following the DFSO event. The integrated fuel amount may be calculated as:

$$IAF = \int (RichFuel_{measured} - Fuel_{needed\text{-}for\text{-}stoich})$$

and may include the units lbm (pounds mass of fuel). The monitor may calculate the fuel mass based on the output of the HEGO sensor and/or based on a duration of the DFSO event as well as a manifold air flow during the DFSO event (to account for the amount of air flowing through the cylinders during the DFSO). Therefore, the monitor is a measure of how much fuel is required to force catalyst breakthrough from lean to rich. If the estimated amount is higher than a threshold, it may be confirmed that the catalyst monitoring is complete. The integrated amount of fuel (IAF) monitor usually runs on the reactivation (after a DFSO event is over) and compares the actual fueling to the "expected" fueling for a "good" catalyst to determine if more or less fuel was needed. Accordingly, based on the comparison, the monitor is able to determine if the catalyst is bad or good (and a level of catalyst degradation). Typically the monitor event is completed when the HEGO voltage exceeds some lean-to-rich threshold, indicating that the catalyst is now reactivated.

In particular, when the CMS and catalyst monitors are completed, it may be inferred that the monitored catalyst volume (which includes the volume of the after-treatment device from the UEGO sensor to the HEGO sensor, and including only the upstream catalyst of the after-treatment device) is saturated. If CMS and catalyst monitoring is not complete, then the method moves to 318 where a transition to the DCCO mode is delayed. The method then returns to 316 to continue flowing air through the exhaust components while operating in the DFSO mode, and continue monitoring the HEGO response.

It will be appreciated that a separate EGO functional monitor ensures the HEGO sensor measurement is not "stuck". This does not typically happen during a DFSO event, allowing the two monitors to be independently diagnosed.

Upon confirmation that CMS and catalyst monitoring is complete, at 322, the method includes transitioning from the DFSO mode to the DCCO mode (assuming cylinder deactivation conditions are still present and there is no intermediate increase in torque demand). Transitioning to the DCCO mode of cylinder deactivation may include closing the selected individual cylinder valve mechanisms of the cylinders that already have fueling disabled. Closing valve mechanisms includes closing intake valve mechanisms, exhaust valve mechanisms, or a combination of both by sending a valve closing command from the controller to valve actuators. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. As a result of delaying the transition to the DCCO mode until the CMS and catalyst monitors are completed, the unmonitored catalyst volume (which is the volume of the after-treatment device downstream of the HEGO, and including the downstream catalyst) does not saturate with oxygen. Therefore this volume remains centered around stoichiometry, reducing the fuel penalty required to regenerate the after-treatment device when the cylinders are subsequently reactivated.

At 324, it may be determined if cylinder reactivation conditions are met. Cylinder reactivation may be confirmed responsive to an increase in torque demand, such as may occur when an operator tips in the accelerator pedal. If cylinder reactivation conditions are not met, then at 328, the method includes maintaining the current induction ratio by continuing to operate the engine with selective cylinder deactivation. In particular, fuel injectors and valve mechanisms of selected cylinders may continue to be disabled. If cylinder reactivation conditions are met, then at 326, the method includes reactivating the valve mechanisms and fuel injectors of the previously deactivated cylinders. The method then ends.

In this way, responsive to cylinder deactivation conditions, only fuel and spark is initially disabled in selected cylinders while cylinder valves continue to pump air to allow oxygen saturation to occur at a downstream exhaust after-treatment oxygen sensor (e.g., HEGO sensor) and exhaust catalyst. By enabling the cylinder valves to be deactivated only after confirming that a lean response is observed at the HEGO sensor, and a higher than threshold volume of fuel is required to regenerate the catalyst, oxygen saturation of the after-treatment device is limited to the upstream catalyst. This protects the exhaust volume of the downstream catalyst from being oxygen saturated, reducing the associated fuel penalty during a subsequent catalyst regeneration event. In addition, the earlier transition to operating cylinders with valves also deactivated allows for an additional improvement in fuel economy due to reduced pumping losses.

Turning now to FIG. 4, a prophetic example of a cylinder deactivation event, including an initial DFSO event and a transition to a subsequent DCCO event, is depicted. Map 400 depicts accelerator pedal position (PP) at plot 402. The pedal position is indicative of torque demand. As the accelerator pedal position increases along the y-axis, it indicates that the pedal has been depressed by an operator, and is reflective of an increased demand for engine torque. As the accelerator pedal position decreases along the y-axis, it indicates that the pedal has been released by an operator, and is reflective of a decreased demand for engine torque. The occurrence of a DFSO event is shown at plot 404. When a DFSO flag is on, it implies that one or more cylinders may be selectively deactivated by disabling fuel and spark delivery, while air continues to be pumped through open intake and exhaust valves of the deactivated cylinders. The occurrence of a DCCO event is shown at plot 406. When a DCCO flag is on, it implies that the one or more cylinders that had fuel and spark disabled now also have their intake and exhaust valves closed. An engine induction ratio is depicted at plot 408. The induction ratio may change with torque demand. Based on the selected induction ratio, a number and identity of cylinders to be deactivated is selected. The air-fuel ratio (AFR) sensed at an exhaust HEGO sensor, positioned between an upstream and a downstream catalyst of an exhaust after-treatment device, is shown at plot 410. As the AFR increases along the y-axis, the air-fuel ratio becomes leaner relative to stoichiometry (shown as a dashed line). As the AFR falls below the dashed line, the air-fuel ratio becomes richer relative to stoichiometry. A catalyst monitor output, including an integrated air-fuel mass (IAF) is shown at plot 412. As the output of the monitor increases along the y-axis, an amount of fuel that needs to be added to regenerate the catalyst during a subsequent cylinder reactivation increases. The integrated fuel amount is shown relative to a threshold Thr.

Prior to t1, operator torque demand is elevated (plot 402) and the torque demand is met by operating all engine cylinders active. As a result, none of the cylinders are operating with either fuel deactivated (plot 404) or cylinder valves closed (plot 406). The induction ratio achieved with all cylinders firing is 1.0 (plot 408). Cylinders are operated at an AFR around stoichiometry, as detected the downstream HEGO (plot 410). The catalyst monitor is disabled at this time (plot 412).

At t1, responsive to an operator pedal tip-out, cylinder deactivation conditions are met. To improve the signal-to-noise ratio of a HEGO response during the subsequent DFSO, before deactivating any cylinders, the engine is transiently operated (between t1 and t2) with a richer than stoichiometric AFR to generate a rich response at the HEGO. At t2, once a rich response is observed at the HEGO, a low induction ratio corresponding to the lower torque demand is provided by selectively deactivating one or more cylinders. The number of cylinders deactivated may be increased as the torque demand decreases, allowing the same torque demand to be met using a fewer number of active cylinders operating with a higher average output and therefore a lower pumping loss. The cylinders selected for deactivation are transitioned to a DFSO mode by deactivating corresponding fuel injectors. However, cylinder valves remain open as indicated by the DCCO flag remaining in the off state. As a result of the deactivation, the induction ratio drops below 1.0 (for example, drops to 0.5 where every second cylinder is deactivated, or 0.67 where every third cylinder is deactivated).

As a result of cylinder fueling being disabled while cylinder valves continue to operate, air (without fuel) flows through the cylinders towards the exhaust components, causing a gradual oxygen saturation. This is observed based on a gradual increase in the AFR estimated at the HEGO sensor. At t3, the HEGO output reaches a stoichiometric level and then after t3, starts transitioning towards a lean response. However, at this time the catalyst monitor is not complete (as elaborated below) and so cylinder valves remain open.

Concurrently, while air flows through the HEGO sensor, the volume of the after-treatment device from an upstream UEGO to the downstream HEGO, and including an upstream catalyst positioned between the UEGO and the HEGO, becomes saturated with oxygen. As a result, the total (integrated) amount of fuel that is estimated to be required to regenerate the catalyst upon cylinder reactivation starts to increase. This fuel mass estimation is based on the duration of the DFSO and the mass air flow through the cylinders.

At t4, the integrated fuel mass exceeds threshold Thr, indicative of the catalyst monitor having been completed. Responsive to both the HEGO sensor having displayed a rich to lean transition, and the catalyst monitor being completed, at t4, cylinder valves are closed (of the selectively deactivated cylinders), while fuel and spark remains disabled, thereby transitioning from the DFSO mode to the DCCO mode. By transitioning responsive to the HEGO response, the volume of the after-treatment device from the downstream HEGO, and including a downstream catalyst positioned after the HEGO, is protected from becoming saturated with oxygen. As a result, an amount of fuel required to regenerate the after-treatment device is reduced.

Between t4 and t5, the deactivated cylinders are operated in the DCCO mode. The HEGO response remains lean and the catalyst monitor fuel requirement plateaus out since no further oxygen saturation of the catalyst is occurring.

At t5, responsive to an operator pedal tip-in, cylinder reactivation conditions are met. As a result, the previously deactivated cylinders are reactivated by resuming fuel and spark delivery and valve operation. As a result of resuming cylinder operation, the HEGO output returns towards a stoichiometric level. In addition, the catalyst monitor fuel requirement starts to drop. The DFSO and DCCO flags are removed. The engine resumes operating at an induction ratio of 1.0 with all cylinders active.

In this way, cylinder deactivation in a rolling variable displacement engine can be enabled in a manner that balances fuel efficiency, monitor completion, and tailpipe emissions. By disabling only fuel and spark initially when cylinder deactivation conditions are met, flow of air through the cylinders and oxygen saturation of an exhaust catalyst and associated oxygen sensor can be leveraged for monitor completion. The technical effect of disabling valve operation responsive to a lean response at the catalyst monitor sensor is that oxygen saturation of the after-treatment device can be limited to a volume including only an upstream catalyst. By reducing or averting oxygen saturation of a downstream catalyst, a fuel penalty associated with regenerating the catalyst is reduced. At the same time, monitor completion during a drive cycle is better ensured. Furthermore, a DFSO to DCCO transition is enabled earlier, which improves fuel economy by reducing pumping losses. Overall, engine fuel economy and exhaust emissions are improved.

One example method comprises: responsive to decreased torque demand, deactivating fuel to a cylinder, while maintaining valve operation; and further deactivating the valve operation of the cylinder responsive to completion of an exhaust catalyst and/or associated exhaust oxygen sensor diagnostic. In the preceding example, additionally or optionally, deactivating responsive to the completion of the exhaust catalyst and/or associated exhaust oxygen sensor diagnostic includes deactivating the valve operation of the cylinder responsive to a lean response at an exhaust oxygen sensor coupled between the exhaust catalyst and a tailpipe. In any or all of the preceding examples, additionally or optionally, the deactivating the valve operation is further responsive to a higher than threshold integrated fuel mass estimated to be required during a subsequent cylinder reactivation. In any or all of the preceding examples, additionally or optionally, the exhaust oxygen sensor is a heated exhaust oxygen sensor. In any or all of the preceding examples, additionally or optionally, the exhaust catalyst is a first, upstream catalyst of an exhaust after-treatment device, the device further including a second, downstream catalyst coupled downstream of the exhaust oxygen sensor. In any or all of the preceding examples, additionally or optionally, the lean response includes the first catalyst being oxygen saturated while the second catalyst not being oxygen saturated. In any or all of the preceding examples, additionally or optionally, the lean response includes one of a richer than stoichiometry to leaner than stoichiometry transition in air-fuel ratio at the oxygen sensor, and a stoichiometry to leaner than stoichiometry transition in the air-fuel ratio at the oxygen sensor. In any or all of the preceding examples, additionally or optionally, the method further comprises, responsive to the diagnostic not being completed, delaying deactivating the valve operation. In any or all of the preceding examples, additionally or optionally, deactivating fuel while maintaining valve operation includes flowing air through the exhaust catalyst and the associated oxygen sensor.

Another example method for an engine with selectively deactivatable cylinders comprises: responsive to vehicle deceleration, disabling fuel to selected engine cylinders from stoichiometric or rich operation while continuing to pump air through cylinder valves towards a downstream exhaust catalyst and exhaust gas oxygen sensor; and disabling intake and exhaust valves of the selected engine cylinders only after a lean response at the exhaust gas oxygen sensor. In the preceding example, additionally or optionally, the method further comprises delaying the disabling of the intake and exhaust valves responsive to a delay in the lean response at the exhaust gas oxygen sensor. In any or all of the preceding examples, additionally or optionally, the exhaust catalyst is a first catalyst of an exhaust after-treatment device, and the exhaust gas oxygen sensor is a heated exhaust gas oxygen sensor coupled between the first catalyst and a second catalyst, the second catalyst coupled downstream of the first catalyst in the exhaust after-treatment device. In any or all of the preceding examples, additionally or optionally, disabling intake and exhaust valves of the selected engine cylinders responsive to the lean response at the exhaust gas oxygen sensor includes disabling the intake and exhaust valves after the first catalyst is oxygen saturated and before the second catalyst is oxygen saturated. In any or all of the preceding examples, additionally or optionally, the lean response includes a higher than threshold oxygen saturation of the first catalyst. In any or all of the preceding examples, additionally or optionally, the method further comprises operating the engine with a richer than stoichiometric air-fuel ratio for a duration before disabling the fuel, and wherein the lean response includes a richer than stoichiometric to leaner than stoichiometric air-fuel ratio transition.

Another example engine system comprises: a cylinder of an engine; a selectively deactivatable fuel injector coupled to the cylinder; a selectively deactivatable valve mechanism coupled to an intake valve and an exhaust valve of the cylinder; another cylinder of the engine; an exhaust after-treatment device coupled downstream of the cylinder and the another cylinder, the after-treatment device including a first, upstream catalyst and a second, downstream catalyst; a UEGO sensor coupled upstream of the first catalyst; a HEGO sensor coupled in between the first catalyst and the second catalyst; and a controller with computer readable instructions stored on non-transitory memory that when executed cause the controller to: responsive to decreased operator torque demand, operate the cylinder in a deceleration fuel shut-off mode with fuel disabled and valve operation enabled while maintaining the another cylinder active; monitor a change in air-fuel ratio at the first catalyst via an output of the HEGO sensor while flowing air, without fuel, through the cylinder to the exhaust after-treatment device; and responsive to the monitored change being indicative of oxygen saturation of the first catalyst, transition the cylinder to a deceleration cylinder cut-off mode with fuel and valve operation disabled. In the preceding examples additionally or optionally, the monitored change includes a transition from stoichiometric air-fuel ratio to leaner than stoichiometric air-fuel ratio. In any or all of the preceding examples, additionally or optionally, the monitored change is indicative of no oxygen saturation of the second catalyst. In any or all of the preceding examples, additionally or optionally, the monitored change is further indicative of completion of a catalyst monitor. In any or all of the preceding examples, additionally or optionally, the controller includes further instructions that cause the controller to delay the transition from the deceleration fuel shut-off mode to the deceleration cylinder cut-off mode until the monitored change is indicative of oxygen saturation of the first catalyst.

In another representation, a method for an engine comprises: delaying transition of one or more cylinders from a deceleration fuel shut-off (DFSO) mode to a deceleration cylinder cut-off (DCCO) mode until an exhaust catalyst and/or associated exhaust oxygen sensor diagnostic is completed. In the preceding example, additionally or optionally, each of the DFSO mode and the DCCO mode are enabled responsive to a decrease in operator demanded torque. In any or all of the preceding examples, additionally or optionally, delaying the transition includes continuing to operate in the DFSO mode with cylinder fueling deactivated and cylinder intake and exhaust valve operation enabled until the diagnostic is completed. In any or all of the preceding examples, additionally or optionally, responsive to the diagnostic being completed, deactivating the intake and exhaust valve operation of the cylinder while maintaining cylinder fueling deactivated. In any or all of the preceding examples, additionally or optionally, the catalyst diagnostic being completed includes confirming a rich-to-lean or stoichiometric-to-lean response at an exhaust gas oxygen sensor coupled downstream of the first catalyst. In any or all of the preceding examples, additionally or optionally, the associated oxygen sensor diagnostic being completed includes an integrated amount of fuel expected to be required upon cylinder reactivation being above a lower threshold and below an upper threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to decreased torque demand,
deactivating fuel to a cylinder, while maintaining valve operation; and
further deactivating the valve operation of the cylinder responsive to completion of an exhaust catalyst and/or associated exhaust oxygen sensor diagnostic.

2. The method of claim 1, wherein deactivating responsive to the completion of the exhaust catalyst and/or associated exhaust oxygen sensor diagnostic includes deactivating the valve operation of the cylinder responsive to a lean response at an exhaust oxygen sensor coupled between the exhaust catalyst and a tailpipe.

3. The method of claim 2, wherein the deactivating the valve operation is further responsive to a higher than threshold integrated fuel mass estimated to be required during a subsequent cylinder reactivation.

4. The method of claim 2, wherein the exhaust oxygen sensor is a heated exhaust oxygen sensor.

5. The method of claim 2, wherein the exhaust catalyst is a first, upstream catalyst of an exhaust after-treatment device, the device further including a second, downstream catalyst coupled downstream of the exhaust oxygen sensor.

6. The method of claim 5, wherein the lean response includes the first catalyst being oxygen saturated while the second catalyst not being oxygen saturated.

7. The method of claim 2, wherein the lean response includes one of a richer than stoichiometry to leaner than stoichiometry transition in air-fuel ratio at the oxygen sensor, and a stoichiometry to leaner than stoichiometry transition in the air-fuel ratio at the oxygen sensor.

8. The method of claim 1, further comprising, responsive to the diagnostic not being completed, delaying deactivating the valve operation.

9. The method of claim 1, wherein deactivating fuel while maintaining valve operation includes flowing air through the exhaust catalyst and the associated oxygen sensor.

10. A method for an engine with selectively deactivatable cylinders, comprising:
responsive to vehicle deceleration,
disabling fuel to selected engine cylinders from stoichiometric or rich operation while continuing to pump air through cylinder valves towards a downstream exhaust catalyst and exhaust gas oxygen sensor; and
disabling intake and exhaust valves of the selected engine cylinders only after a lean response at the exhaust gas oxygen sensor.

11. The method of claim 10, further comprising, delaying the disabling of the intake and exhaust valves responsive to a delay in the lean response at the exhaust gas oxygen sensor.

12. The method of claim 10, wherein the exhaust catalyst is a first catalyst of an exhaust after-treatment device, and the exhaust gas oxygen sensor is a heated exhaust gas oxygen sensor coupled between the first catalyst and a second catalyst, the second catalyst coupled downstream of the first catalyst in the exhaust after-treatment device.

13. The method of claim 12, wherein disabling intake and exhaust valves of the selected engine cylinders responsive to the lean response at the exhaust gas oxygen sensor includes disabling the intake and exhaust valves after the first catalyst is oxygen saturated and before the second catalyst is oxygen saturated.

14. The method of claim 10, wherein the lean response includes a higher than threshold oxygen saturation of the first catalyst.

15. The method of claim 10, further comprising, operating the engine with a richer than stoichiometric air-fuel ratio for a duration before disabling the fuel, and wherein the lean response includes a richer than stoichiometric to leaner than stoichiometric air-fuel ratio transition.

16. An engine system, comprising:
a cylinder of an engine;
a selectively deactivatable fuel injector coupled to the cylinder;
a selectively deactivatable valve mechanism coupled to an intake valve and an exhaust valve of the cylinder;
another cylinder of the engine;
an exhaust after-treatment device coupled downstream of the cylinder and the another cylinder, the after-treatment device including a first, upstream catalyst and a second, downstream catalyst;
a UEGO sensor coupled upstream of the first catalyst;
a HEGO sensor coupled in between the first catalyst and the second catalyst; and
a controller with computer readable instructions stored on non-transitory memory that when executed cause the controller to:
responsive to decreased operator torque demand,
operate the cylinder in a deceleration fuel shut-off mode with fuel disabled and valve operation enabled while maintaining the another cylinder active;
monitor a change in air-fuel ratio at the first catalyst via an output of the HEGO sensor while flowing air, without fuel, through the cylinder to the exhaust after-treatment device; and
responsive to the monitored change being indicative of oxygen saturation of the first catalyst, transition the cylinder to a deceleration cylinder cut-off mode with fuel and valve operation disabled.

17. The system of claim 16, wherein the monitored change includes a transition from stoichiometric air-fuel ratio to leaner than stoichiometric air-fuel ratio.

18. The system of claim 16, wherein the monitored change is indicative of no oxygen saturation of the second catalyst.

19. The system of claim 16, wherein the monitored change is further indicative of completion of a catalyst monitor.

20. The system of claim 16, wherein the controller includes further instructions that cause the controller to:
delay the transition from the deceleration fuel shut-off mode to the deceleration cylinder cut-off mode until the monitored change is indicative of oxygen saturation of the first catalyst.

* * * * *